(12) United States Patent
Champion et al.

(10) Patent No.: US 8,584,091 B2
(45) Date of Patent: Nov. 12, 2013

(54) MANAGEMENT OF GRAPHICAL INFORMATION NOTES

(75) Inventors: David Frederick Champion, Durham, NC (US); Patrick Gabor Nyeste, Raleigh, NC (US); Jeffrey John Smith, Raleigh, NC (US); David Thomas Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 11/741,650

(22) Filed: Apr. 27, 2007

(65) Prior Publication Data
US 2008/0270976 A1 Oct. 30, 2008

(51) Int. Cl.
*G06F 9/44* (2006.01)

(52) U.S. Cl.
USPC .......................................................... 717/125

(58) Field of Classification Search
USPC .......... 717/113, 109, 124, 125–127; 709/206, 709/223, 204, 224; 345/629, 810; 715/204, 715/746, 751, 764, 810, 828, 513; 725/46, 725/61; 707/803, 102; 382/173, 243; 705/37
See application file for complete search history.

(56) References Cited

U.S. PATENT DOCUMENTS

| | | | |
|---|---|---|---|
| 4,819,191 A | 4/1989 | Scully et al. | |
| 5,165,012 A | 11/1992 | Crandall et al. | |
| 5,859,640 A | 1/1999 | de Judicibus | |
| 7,136,915 B2 * | 11/2006 | Rieger, III | 709/223 |
| 7,685,209 B1 * | 3/2010 | Norton et al. | 707/803 |
| 2001/0054004 A1 * | 12/2001 | Powers | 705/14 |
| 2002/0087451 A1 * | 7/2002 | Rieger et al. | 705/37 |
| 2002/0138582 A1 * | 9/2002 | Chandra et al. | 709/206 |
| 2003/0063128 A1 * | 4/2003 | Salmimaa et al. | 345/810 |
| 2004/0061716 A1 | 4/2004 | Cheung et al. | |
| 2004/0128353 A1 * | 7/2004 | Goodman et al. | 709/204 |
| 2004/0268232 A1 * | 12/2004 | Tunning | 715/513 |
| 2005/0091578 A1 | 4/2005 | Madan et al. | |
| 2005/0198270 A1 * | 9/2005 | Rusche et al. | 709/224 |
| 2006/0061597 A1 * | 3/2006 | Hui | 345/629 |
| 2006/0200691 A1 * | 9/2006 | Yomo et al. | 713/323 |
| 2006/0265413 A1 * | 11/2006 | Blencowe | 707/102 |
| 2006/0281522 A1 * | 12/2006 | Walker et al. | 463/18 |
| 2007/0086669 A1 * | 4/2007 | Berger et al. | 382/243 |
| 2007/0230893 A1 * | 10/2007 | Meron et al. | 386/4 |
| 2007/0264985 A1 * | 11/2007 | Kapur et al. | 455/414.1 |
| 2010/0104185 A1 * | 4/2010 | Johnson et al. | 382/173 |

OTHER PUBLICATIONS

"User Interface Pop-up Duration by Contained Content", IBM Corp., IBM Technical Disclosure Bulletin, Apr. 1994, vol. 37, No. 4A, pp. 623-624.
IBM, "Mouseover Scratchpad for Desktop Items", IP.com, Document No. IPCOM000136549D, May 22, 2006, pp. 1-3.
"Notes PlusPlus Feature List", Desktop Notes—Sticky Notes Software, [online][retrieved Apr. 27, 2007] http:notespluplus.com/sticky-notes-software.html.
"StickyNote 9.0",StickyNotes, [online][retrieved Apr. 27, 2007] http:www.download.com/StickyNote/3000-2351_4-10257904.html.

* cited by examiner

*Primary Examiner* — Tuan A Vu
(74) *Attorney, Agent, or Firm* — Rabindranath Dutta; Konrad, Raynes, Davda & Victor LLP

(57) ABSTRACT

Provided are a method, system, and article of manufacture, wherein information is associated with a program element that is capable of being processed in a software environment generated by an operating system. A graphical information note application is executed in response to a processing of the program element in the software environment. A graphical information note that includes the associated information is displayed, in response to the execution of the graphical information note application.

21 Claims, 8 Drawing Sheets

| Priority | Timestamp | Surface Application / Action | Content |
|---|---|---|---|
| Priority level | 11:00 AM 07/10/06 | Shutdown<br>Lotus Notes | Write email to team about vacation plans |
| Priority level | 11:02 AM 07/10/06 | Print<br>Word | Print meeting notes from Tuesday |
| Priority level | 11:06 AM 07/10/06 | Outlook<br>PowerPoint | Email friends PowerPoint for brainstorming |
| | | | |
| | | | |

800 — Priority
802 — Timestamp
804 — Surface Application / Action
806 — Content

FIG. 8

MANAGEMENT OF GRAPHICAL INFORMATION NOTES

BACKGROUND

1. Field

The disclosure relates to a method, system, and article of manufacture for the management of graphical information notes.

2. Background

Physical "sticky notes" are widely used in office environments. Such physical sticky notes are relatively small physical pieces of paper on which an adhesive has been applied on one side to facilitate the attachment of the physical sticky note to a physical surface. Users may write reminders on such physical sticky notes and use these physical sticky notes as reminder aids.

Certain software systems allow electronic versions of such physical sticky notes to be used. Such electronic versions of the physical sticky notes may be referred to as graphical information notes. Such graphical information notes may be displayed on the desktop and may allow users to make quick, temporary notes. Graphical information notes that pop up at predetermined times may be found in certain software systems. However, graphical information notes may have many of the same problems as physical sticky notes. Clutter and improper arrangements of graphical information notes may reduce the effectiveness of this memory aid and important tasks may be forgotten by users.

SUMMARY OF THE PREFERRED EMBODIMENTS

Provided are a method, system, and article of manufacture, wherein information is associated with a program element that is capable of being processed in a software environment generated by an operating system. A graphical information note application is executed in response to a processing of the program element in the software environment. A graphical information note that includes the associated information is displayed, in response to the execution of the graphical information note application.

In additional embodiments, the program element comprises one of an application, a file, an event, and an action, wherein the information can be associated with more than one program element, and wherein the graphical information note includes an indication of the program element with which the information is associated during the displaying of the graphical information note.

In further embodiments, the execution of the graphical information note application to display the graphical information note occurs in response to a user action performed in the software environment.

In still further embodiments, the execution of the graphical information note application to display the graphical information note is in response to a series of events occurring in a computational device that implements the software environment.

In yet further embodiments, the executing and displaying further comprises analyzing one or more words included in the information associated with the program element, and triggering the graphical information note application to display the graphical information note is based on the analyzing of the one or more words included in the information associated with the program element.

BRIEF DESCRIPTION OF THE DRAWINGS

Referring now to the drawings in which like reference numbers represent corresponding parts throughout:

FIG. 8 illustrates a block diagram for organizing and consolidating graphical information notes, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Certain embodiments provide action, event, application and file-based reminders on graphical information notes. In certain embodiments, graphical information notes may be associated with particular documents, folders and applications and may be opened to remind the user of important tasks. Associated graphical information notes can pop up automatically on a display with the opening of a particular file, an attempt to perform a particular action, or the startup of an application. For example, a prompt to look at a particular website may open when an Internet browser window is opened, or a reminder to print out a particular document may pop up when other documents are printed. Application, action, and file-based reminders provide additional capabilities beyond time-based reminders.

In certain other embodiments, graphical information notes may alert users about active notes automatically upon the startup of a computational device, and on attempts to shut down, hibernate, or restart a computational device.

In certain embodiments graphical information notes may have a minimal footprint, moving to a designated area of the display and displaying only a title if desired, in order to keep the desktop from being cluttered. Graphical information notes may also automatically organize themselves by importance, topic, date, etc. within a folder for easy viewing, sorting, printing, emailing, and managing of the graphical information notes. Graphical information notes could then be reapplied to particular documents, moved to new drafts, organized, etc.

Graphical information notes may provide additional capabilities beyond a permanent to-do list and simple temporallybased reminders provided by certain applications. Combining the automatic alert element with the ability to affiliate particular graphical information notes with applications, documents, etc., may eliminate certain problems related to the usage of graphical information notes. For example, clutter of graphical information notes on the display and the likelihood of forgotten reminders may be reduced.

Exemplary Embodiments

Figure 1:
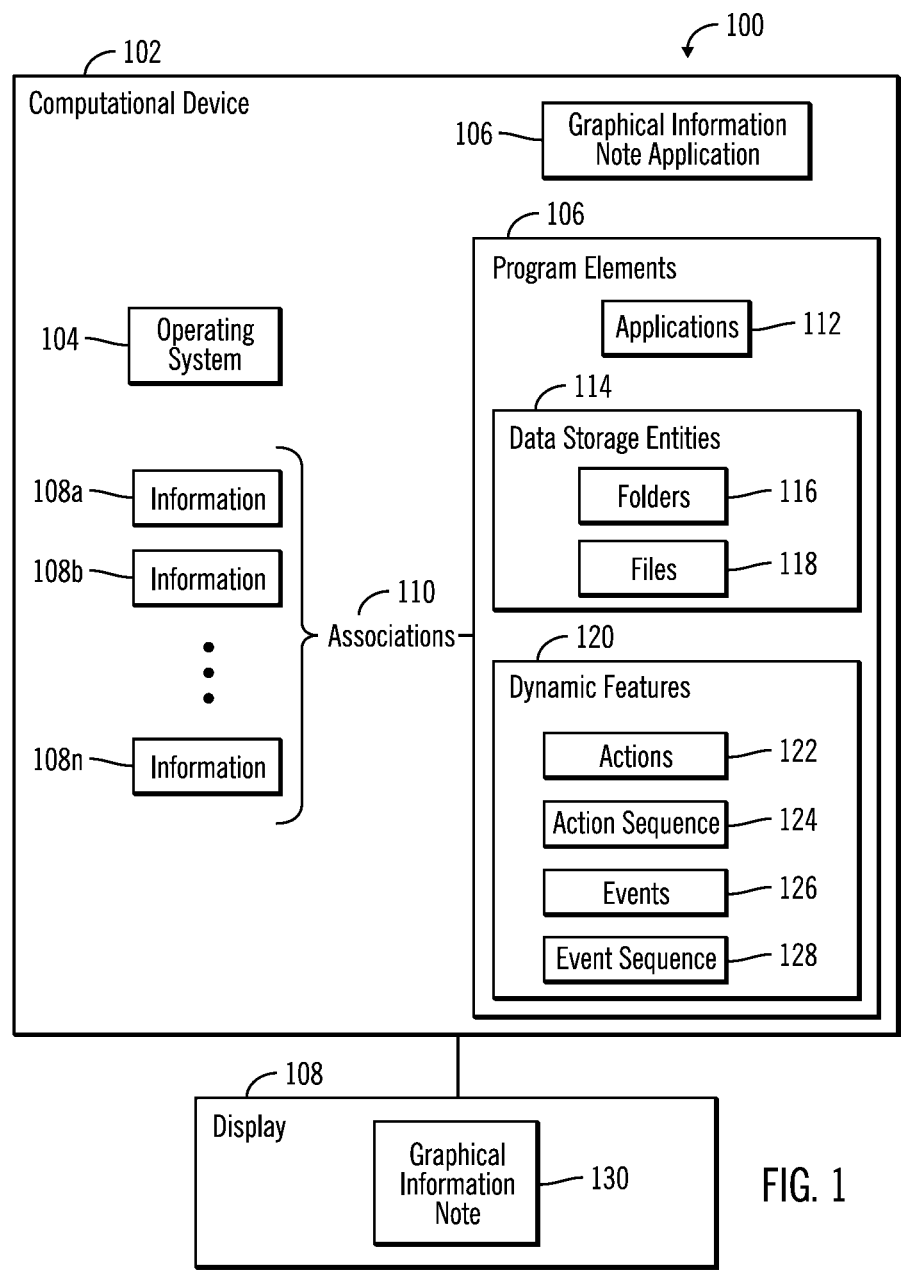
FIG. 1 illustrates a block diagram of a computing environment, in accordance with certain embodiments.

FIG. 1 illustrates block diagram of a computing environment 100 in which a computational device 102 is included. The computational device 102 may be any computational device known in the art, such as a personal computer, a workstation, a server, a mainframe, a hand held computer, a palm top computer, a telephony device, a network appliance, etc.

The computational device 102 includes an operating system 104, a graphical information note application 104, and is capable of including, executing, generating, or allow the generating of program elements 106. A display 108 may be coupled to the computational device 102, where the display 108 may comprise any display device known in the art, such as a LCD (Liquid Crystal Display) device, etc.

The graphical information note application 106 is an application implemented in software, hardware, firmware, or any combination thereof in the computational device 102. The program elements 106 may include many different types of applications 112 (e.g., electronic mail programs, word processing programs, etc.), data storage entities 114 (e.g., folders 116, files 118, etc.), dynamic features 120 (e.g., actions 122, action sequences 124, events 126, event sequences 128), etc. Actions 122 may include actions performed by a user, such as a mouse click to print a file. Events 124 may include any event occurring within the computational device 102, such as, a startup or shutdown of the computational device 102. In certain embodiments, graphical information notes may be transferred over a wired connection or over a wireless connection from one device to another. For example, a graphical information note may be transferred from a desktop computer to a mobile telephony device over a wireless network by utilizing mobile operating systems or other software programs. Transfers of graphical information notes may also be accomplished via electronic transmissions that include electronic mail, short message service (SMS), SMSVoice, Bluetooth* wireless technology, universal serial bus (USB), or other mechanisms. Additionally, graphical information notes generated or edited within a mobile device may be transferred back to workstations, laptops or any computational device. In certain embodiments, software graphical information note management application programs could include actions associated with mobile devices such as call actions, alarms, etc, which can control the display or salience of the graphical information notes. Other embodiments may include additional program elements not shown in FIG. 1.

A plurality of different types of information (denoted by reference numerals 108a, 108b, ... 108n) may be associated with the program elements 106 via associations 110 created by the graphical information note application 106. For example, in certain embodiments information 108a may be a reminder that is associated with a file 118, and information 108b may be a reminder that is associated with a sequence of events 128 that could potentially occur in a software environment generated by the operating system 104. The information 108 ... 108n may be associated with any of the many different types of program elements 112, 114, 116, 118, 120, 122, 124, 126, and 128 shown in FIG. 1.

In certain embodiments illustrated in FIG. 1, the graphical information note application 106 associates information 108a ... 108n with program elements 106 that are capable of being processed in a software environment generated by an operating system 104. The graphical information note application 106 is executed in response to a processing of a program element in the software environment. A graphical information note 130 that includes the associated information, is displayed in the display 108, in response to the execution of the graphical information note application 106.

FIGS. 2-9 illustrate various types on graphical information notes 130 that appear on the display 108 in certain embodiments. Other embodiments may display other types of elements and graphical information notes on the display 108.

Figure 2:
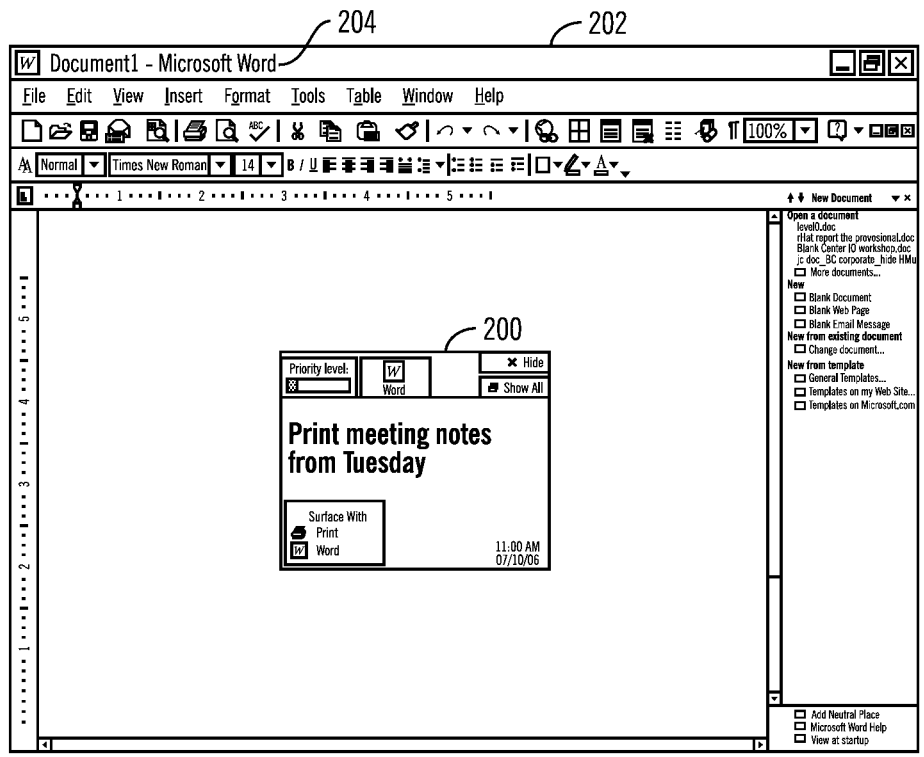
FIG. 2 illustrates a block diagram of a first graphical information note, in accordance with certain embodiments.
Figure 3:
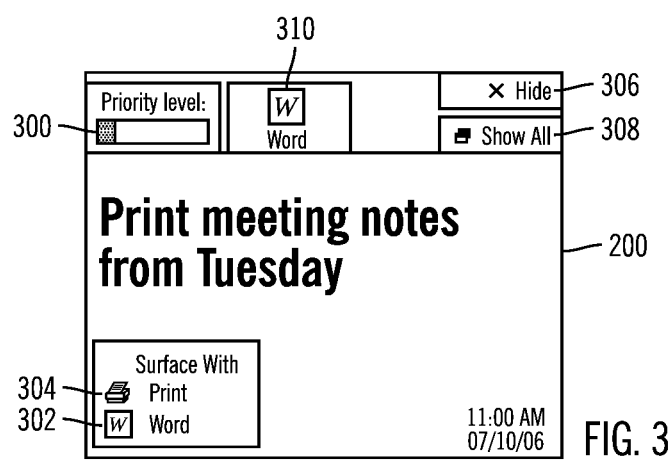
FIG. 3 illustrates a block diagram of a magnified version of the first graphical information note, in accordance with certain embodiments.

FIG. 2 shows an exemplary graphical information note 200 displayed in an exemplary window 202 on the display 108. FIG. 3 shows a magnified view of the exemplary graphical information note 200. In FIGS. 2 and 3, a user has elected to surface, i.e., popup or display, a low-priority note (indicated redundantly by the relatively small area occupied by the bar 300) with an exemplary application 302 (Microsoft Word*) or action 304 (printing). In this instance, the note surfaced when the user opened Microsoft Word 204. The graphical information note 200 can be hidden with a single mouse click on the "Hide" button 306 of the sticky note 200. In addition, all graphical information notes can be displayed and managed by pressing the "Show All" button 308. The opening of the graphical information note with Microsoft Word is shown via reference numeral 310 which shows the Microsoft Word application.

Figure 4:
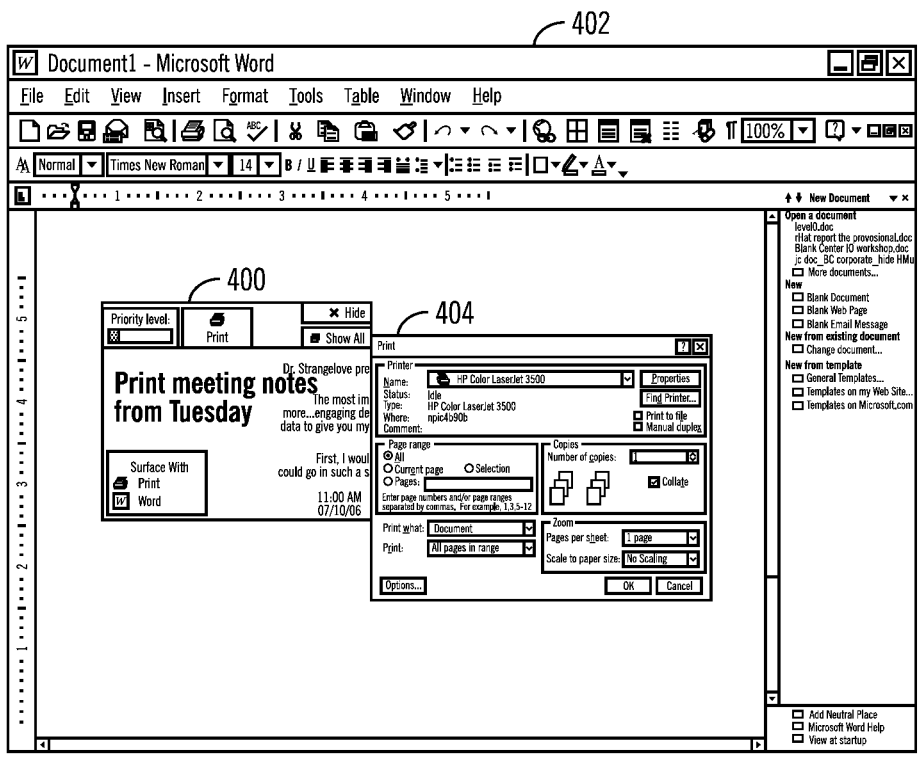
FIG. 4 illustrates a block diagram of a second graphical information note, in accordance with certain embodiments.
Figure 5:
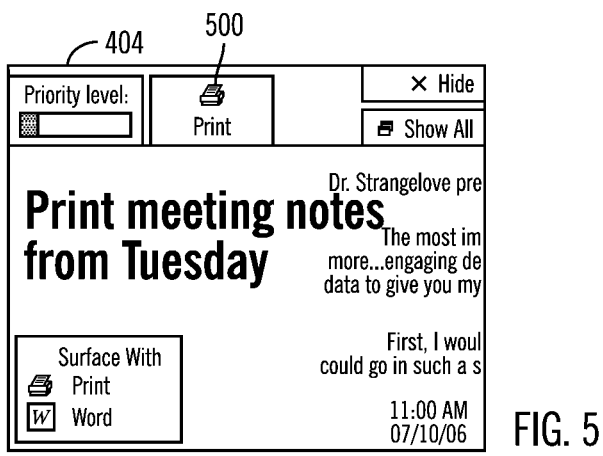
FIG. 5 illustrates a block diagram of a magnified version of the second graphical information note, in accordance with certain embodiments.

FIG. 4 shows an exemplary graphical information note 400 displayed in an exemplary window 402 on the display 108. FIG. 5 shows a magnified view of the exemplary graphical information note 400. FIGS. 4 and 5 display the same graphical information note of FIGS. 2 and 3 surfaced when a user-selected printing action is initiated. Redundant indication (shown by reference numeral 500 that indicates print) is used to indicate the reason why the graphical information note 400 surfaced, in order to eliminate user confusion about why a particular reminder appeared. In order to achieve this redundancy, the graphical information note 400 is attached to the printing menu 404, Additionally, the graphical information note 400 indicates has a "print" 500 indicator.

Figure 6:
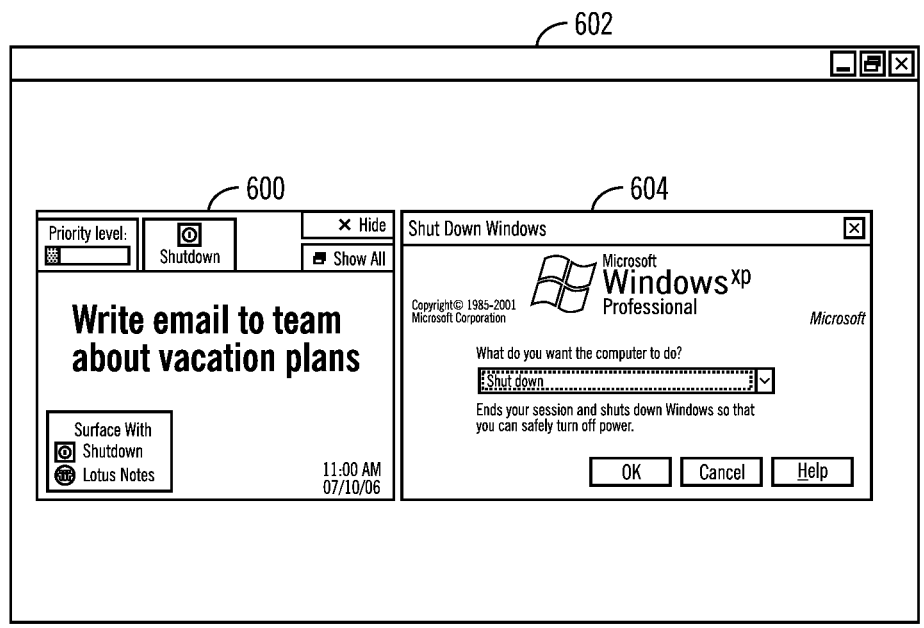
FIG. 6 illustrates a block diagram of a third graphical information note, in accordance with certain embodiments.
Figure 7:
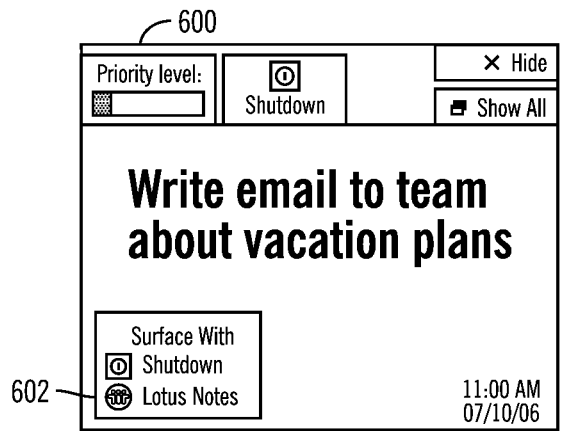
FIG. 7 illustrates a block diagram of a magnified version of the third graphical information note, in accordance with certain embodiments.

FIG. 6 shows an exemplary graphical information note 600 displayed in an exemplary desktop window 602 on the display 108. FIG. 7 shows a magnified view of the exemplary graphical information note 600. FIGS. 6 and 7 demonstrate the surfacing of the graphical information note 600 upon an attempted shutdown as shown by the shutdown window 604. This feature may be designed to prevent users from shutting down systems with important tasks remaining on their to-do lists. This graphical information note 600 may also have surfaced if Lotus Notes* 602 (or any other user-specified application, file, or action) had been accessed or attempted. For example, surfacing of the graphical information note 600 may occur when a user attempts to lock a computational device.

FIG. 8 shows certain embodiments for organizing and consolidating graphical information notes. Graphical information notes can be sorted by priority 800, timestamp 802, surface application/action/files 804, and graphical information note content 806 in the exemplary embodiment shown in FIG. 8. FIG. 8 shows that a graphical information note can be associated with any number of actions, applications, or files.

Figure 9:
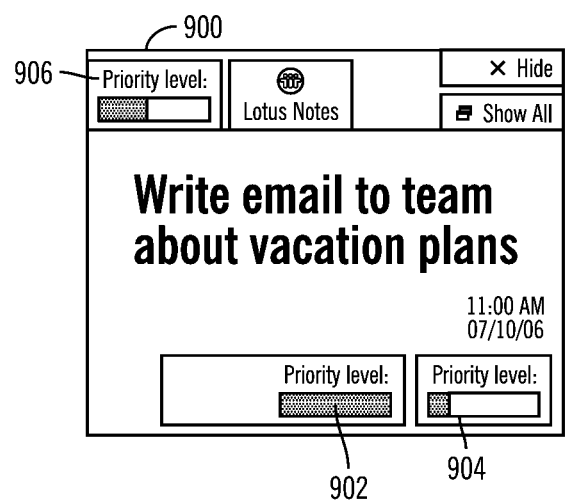
FIG. 9 illustrates a block diagram of a graphical information note that includes multiple cues for displaying priority level information, in accordance with certain embodiments.

FIG. 9 displays a graphical information note 900 that provides an exemplary display of priority level information. In FIG. 9, priority levels may be indicated redundantly by color or shading (reference numeral 902) and area (reference numeral 904) occupied by the bar. For example, light shading may indicate a lower priority and dark shading a higher priority, and a smaller area may indicate a lower priority than a larger area. In certain embodiments a user may be able to determine the priority by either observing the color/shading or by observing the area in the priority level indicator 906.

Figure 10:
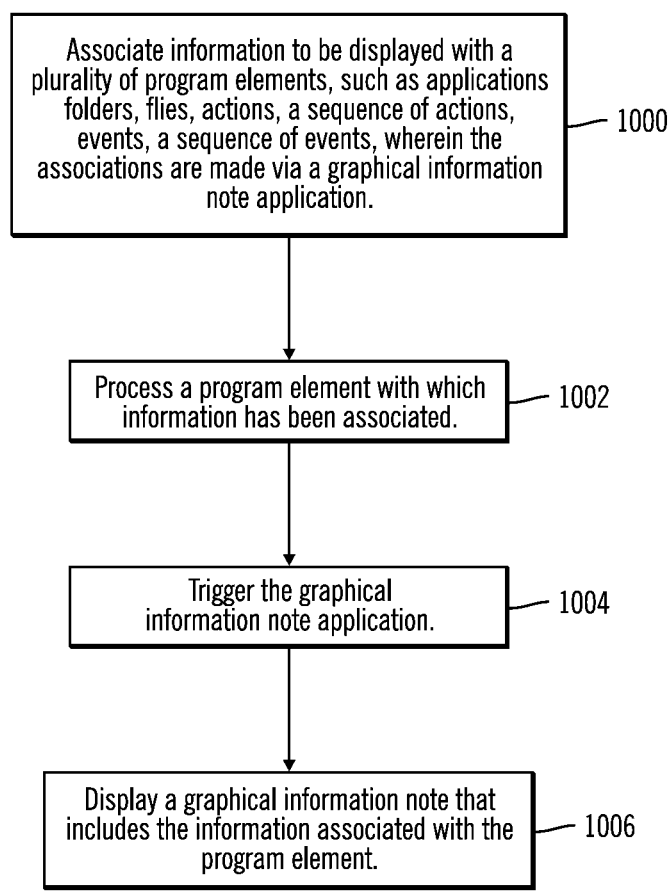
FIG. 10 illustrates operations for managing graphical information notes, in accordance with certain embodiments.

FIG. 10 illustrates operations performed in certain embodiments. The operations may be implemented in the computational device 102.

Control starts at block 1000, where information 108a . . . 108n to be displayed is associated with a plurality of program elements 106, such as applications 112, folders 116, files 118, actions 122, a sequence of actions 124, events 126, a sequence of events 128, wherein the associations are made via a graphical information note application 106. In certain embodiments the same information may be associated with one or more than one program elements. A program element with which information has been associated is processed (at block 1002). As a result, the graphical information note application 106 is triggered (at block 1004). A graphical information note 130 that includes the information associated with the program element is displayed (at block 1006) on the display 108.

For example, in the embodiment shown in FIG. 4 the information "Print meeting notes from Tuesday" (shown within the exemplary graphical information note 400) is associated with the printing action 404. When the printing action is performed the graphical information note application 106 is triggered and the graphical information note 400 that includes the information "Print meeting notes from Tuesday" is displayed on the display 108.

In certain embodiments, graphical information notes surface at a user-specified time, reminding the user of a task and its importance. Embodiments allow the ability to associate reminders with any application, file, and/or action (including startup and shutdown) for rapid surfacing of graphical information notes to users at times when reminders are necessary and intended actions should or can be completed.

Certain embodiments allow the ability to attach reminders to single/multiple applications, actions, and files (e.g., Microsoft Word, shut down, printing). Users may benefit because these reminders are surfaced at a time when intended activities should be completed rather than merely being placed onto the desktop or surfacing at a specific time. In addition, reminders can be redundantly associated with multiple applications, actions, and/or files to increase the effectiveness of the reminders. For example, the task "print meeting notes" could be associated with Microsoft Word, printing, and locking the computer; the reminder would then surface when Microsoft Word was opened, when printing from any application occurred, and upon an attempt to lock the computer.

In additional embodiments mechanisms for the removal of graphical information notes may be implemented. Removal of a graphical information note may be performed via a software button included within the graphical information note or via the graphical information note application. Additionally, a timed expiration mechanism or an automated removal mechanism may be used for the removal of a graphical information note. Other alternative embodiments may provide alternative implementations for the removal of graphical information notes.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), Programmable System on Chip (PSoC). etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.], solid state storage devices (e.g., solid state serial ATA, i.e., solid state SATA, etc.). Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 11:
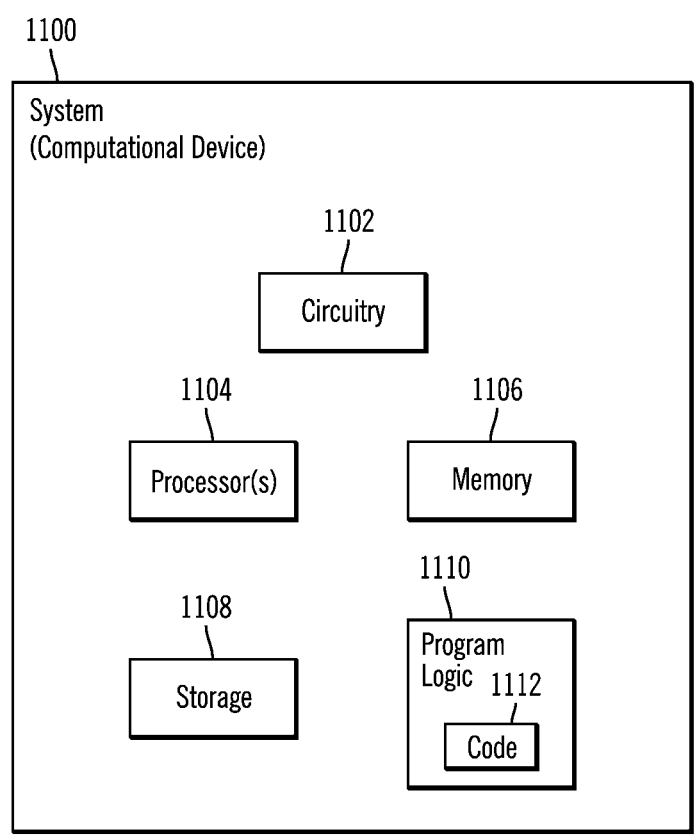
FIG. 11 illustrates a block diagram of a computer architecture in which certain described aspects of the embodiments are implemented.

FIG. 11 illustrates the architecture of computing system 1100, wherein in certain embodiments the computational device 102 of the computing environment 100 of FIG. 1 may be implemented in accordance with the architecture of the computing system 1100. The computing system 1100 may also be referred to as a system, and may include a circuitry 1102 that may in certain embodiments include a processor 1104. The system 1100 may also include a memory 1106 (e.g., a volatile memory device), and storage 1108. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-11 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-11 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

* Microsoft Word is a trademark or registered trademark of Microsoft Corporation.
* Lotus Notes is a trademark or registered trademark of IBM Corporation.
* Bluetooth is a trademark of Bluetooth SIG, Inc.

What is claimed is:

1. A non-transitory computer readable storage medium, where code stored in the non-transitory computer readable medium when executed by a computer performs operations, the operations comprising:

maintaining, in the computer, a graphical information note application, a plurality of program elements including an application, data storage entities, and dynamic features including actions, action sequences, events, and event sequences;

associating information with the plurality of program elements that are capable of being processed in a software environment generated by an operating system;

executing the graphical information note application in response to a processing of a program element of the plurality of program elements in the software environment;

displaying a graphical information note that includes the associated information, in response to the execution of the graphical information note application; and transferring the graphical information note from the computer to a mobile device to control actions associated with the mobile device, wherein:

displayed graphical information notes are sorted by timestamps, priority level, and content;

priority levels are indicated redundantly both via shading and via area occupied by a bar in a priority level indicator of the graphical information note;

a smaller area occupied by the bar in the priority level indicator provides an indication of a lower priority level in comparison to a larger area;

a lighter shading of the bar in the priority level indicator provides an indication of a lower priority level in comparison to a darker shading; and the graphical information note is a first graphical information note, wherein in response to processing a first program element, the first graphical information note is displayed, and wherein the first graphical information note is also displayed in response to processing a second program element that is different from the first program element.

2. The computer readable storage medium of claim 1, wherein the first program element corresponds to an opening of a word processing application and the second program element corresponds to a printing from a selected application.

3. The computer readable storage of claim 2, wherein the first graphical information note is also displayed in response to processing a third program element that is different from the first and second program elements, and wherein the third program element is an attempt to lock the computer.

4. The computer readable storage medium of claim 3, wherein priority is determined via observation of at least one of the shading and the area occupied by the bar, and wherein the graphical information note displays a prompt to look at a selected website, in response to an opening of an Internet browser window.

5. The computer readable storage medium of claim 4, wherein the graphical information note provides an alert, in response to an attempt to hibernate a computational device.

6. The computer readable storage medium of claim 5, wherein pressing of a selected button, displays all graphical information notes.

7. The computer readable storage medium of claim 6, wherein a timed expiration mechanism is used for removal of the graphical information note.

8. A method, comprising:
maintaining, in a computer, a graphical information note application, a plurality of program elements including an application, data storage entities, and dynamic features including actions, action sequences, events, and event sequences;
associating information with the plurality of program elements that are capable of being processed in a software environment generated by an operating system;
executing the graphical information note application in response to a processing of a program element of the plurality of program elements in the software environment;
displaying a graphical information note that includes the associated information, in response to the execution of the graphical information note application; and
transferring the graphical information note from the computer to a mobile device to control actions associated with the mobile device, wherein:
displayed graphical information notes are sorted by timestamps, priority level, and content;
priority levels are indicated redundantly both via shading and via area occupied by a bar in a priority level indicator of the graphical information note;
a smaller area occupied by the bar in the priority level indicator provides an indication of a lower priority level in comparison to a larger area;
a lighter shading of the bar in the priority level indicator provides an indication of a lower priority level in comparison to a darker shading; and
the graphical information note is a first graphical information note, wherein in response to processing a first program element, the first graphical information note is displayed, and wherein the first graphical information note is also displayed in response to processing a second program element that is different from the first program element.

9. The method of claim 8, wherein the first program element corresponds to an opening of a word processing application and the second program element corresponds to a printing from a selected application.

10. The method of claim 9, wherein the first graphical information note is also displayed in response to processing a third program element that is different from the first and second program elements, and wherein the third program element is an attempt to lock the computer.

11. The method of claim 10, wherein priority is determined via observation of at least one of the shading and the area occupied by the bar, and wherein the graphical information note displays a prompt to look at a selected website, in response to an opening of an Internet browser window.

12. The method of claim 11, wherein the graphical information note provides an alert, in response to an attempt to hibernate a computational device.

13. The method of claim 12, wherein pressing of a selected button, displays all graphical information notes.

14. The method of claim 13, wherein a timed expiration mechanism is used for removal of the graphical information note.

15. A system, comprising:
memory; and
processor coupled to the memory, wherein the processor performs operations, the operations comprising:
maintaining, a graphical information note application, a plurality of program elements including an application, data storage entities, and dynamic features including actions, action sequences, events, and event sequences;
associating information with the plurality of program elements that are capable of being processed in a software environment generated by an operating system;
executing the graphical information note application in response to a processing of a program element of the plurality of program elements in the software environment;
displaying a graphical information note that includes the associated information, in response to the execution of the graphical information note application; and
transferring the graphical information note from the computer to a mobile device to control actions associated with the mobile device, wherein:
displayed graphical information notes are sorted by timestamps, priority level, and content;
priority levels are indicated redundantly both via shading and via area occupied by a bar in a priority level indicator of the graphical information note;
a smaller area occupied by the bar in the priority level indicator provides an indication of a lower priority level in comparison to a larger area;
a lighter shading of the bar in the priority level indicator provides an indication of a lower priority level in comparison to a darker shading; and
the graphical information note is a first graphical information note, wherein in response to processing a first program element, the first graphical information note is displayed, and wherein the first graphical information note is also displayed in response to processing a second program element that is different from the first program element.

16. The system of claim 15, wherein the first program element corresponds to an opening of a word processing application and the second program element corresponds to a printing from a selected application.

17. The system of claim 16, wherein the first graphical information note is also displayed in response to processing a third program element that is different from the first and second program elements, and wherein the third program element is an attempt to lock the computer.

18. The system of claim 17, wherein priority is determined via observation of at least one of the shading and the area occupied by the bar, and wherein the graphical information note displays a prompt to look at a selected website, in response to an opening of an Internet browser window.

19. The system of claim 18, wherein the graphical information note provides an alert, in response to an attempt to hibernate a computational device.

20. The system of claim 19, wherein pressing of a selected button, displays all graphical information notes.

21. The system of claim 20, wherein a timed expiration mechanism is used for removal of the graphical information note.

* * * * *